Dec. 9, 1930.  J. J. LAWLER  1,784,734
HYDRO THERMOSTATIC VALVE CONTROL
Filed Jan. 31, 1929
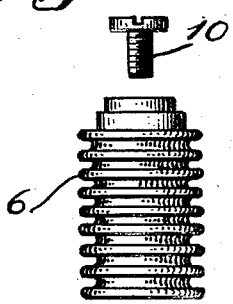
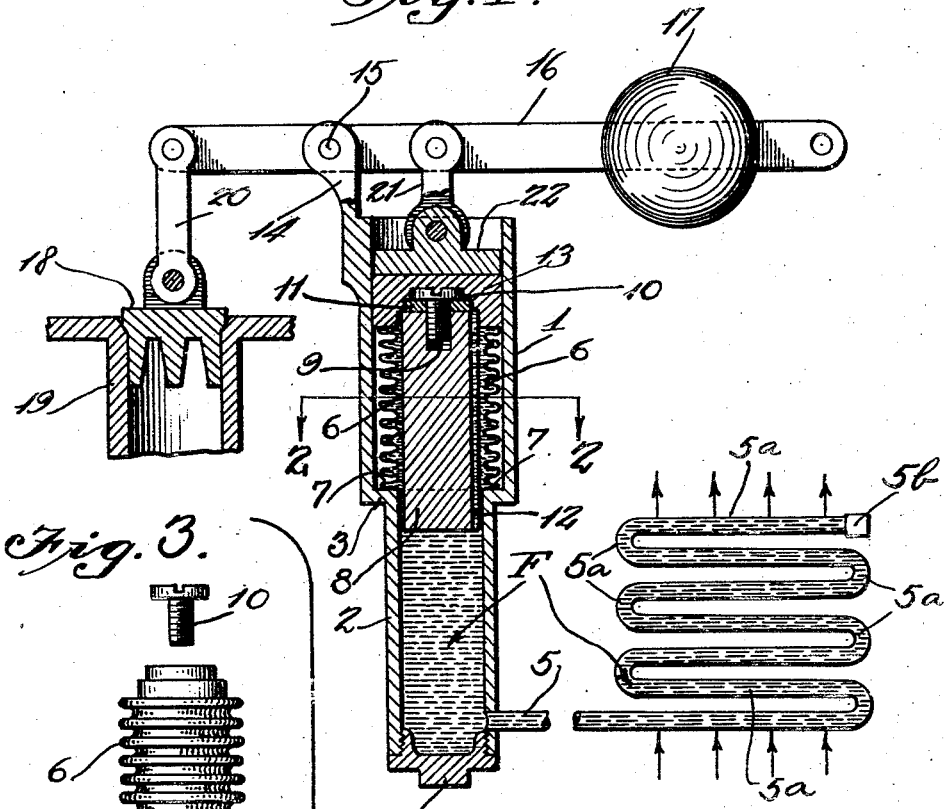
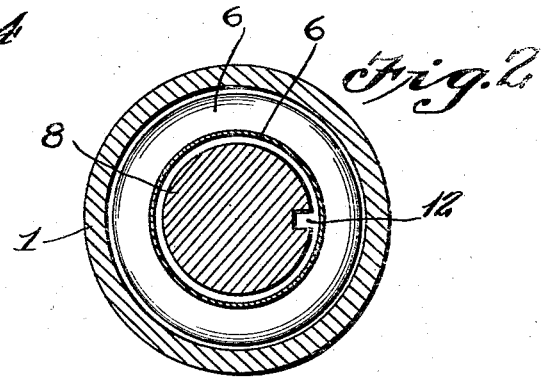
INVENTOR.
James J. Lawler.
BY Bryant & Lowry
ATTORNEYS Patented Dec. 9, 1930

1,784,734

UNITED STATES PATENT OFFICE

JAMES J. LAWLER, OF MOUNT VERNON, NEW YORK

HYDROTHERMOSTATIC VALVE CONTROL

Application filed January 31, 1929. Serial No. 336,554.

This invention relates to certain new and useful improvements in hydrothermostatic valve control of the type comprising an expansible tube or bellows containing a fluid and is designed for controlling the operation of valves in various devices, such as in connection with heating systems.

The primary object of the invention is to provide a hydrothermostatic valve control comprising an expansible tube or bellows that houses a core or plunger fixed to one end thereof to reduce the expansible fluid containing area of the bellows and to render the corrugated edge of the bellows more sensitive to elongation upon expansion of the fluid contained therein.

A further object of the invention is to provide a hydrothermostatic valve of the above type wherein the filling core of the bellows is longitudinally grooved to permit the escape of all air from the bellows during charging thereof with the fluid.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a vertical sectional view of a hydrothermostatic valve control constructed in accordance with the present invention, showing a part of the thermostatic element of the control remotely positioned with respect to the valve operating mechanism;

Figure 2 is an enlarged horizontal sectional view taken on line 2—2 of Figure 1; and Figure 3 is an expanded side elevational view of the expansible tube or bellows with the core insert, and attaching screw and washer.

The hydrothermostatic control valve is illustrated as comprising a cylinder 1 open at its upper end and having a lower section 2 of reduced diameter defining an intermediate annular shoulder 3, the lower end of the reducer lower section 2 of the cylinder being closed by the screw plug 4. A tube 5 communicates with the lower end of the cylinder section 2 which, at a point remote from the cylinder is provided with a plurality of loops 5a positioned for thermostatically controlling the operation of a valve.

The cylinder section 1 contains an expansible tube 6 of bellows formation, the lower end of the tube 6 being spot welded or otherwise secured to the shoulder 3 at the point 7 with the upper end of the tube 6 terminating inwardly of the upper end of the cylinder section 1. A cylindrical core 8 is anchored at its upper end to the upper end of the expansible tube 7, the upper end of the cylindrical core 8 having a fitted socket 9 to receive the screw studs 10 passed through the upper end of the expansible tube 6, a washer 11 being interposed between the upper end of the tube 6 and the cylindrical core 8. The core 8 is longitudinally grooved as at 12 upon one side thereof for purposes presently to appear. A cylindrical block 13 is freely mounted in the upper end of the cylinder section 1 and has its lower face fashioned to receive the upper end of the expansible tube and the retaining screw 10 in the core 8 as shown in Figure 1.

A bracket arm 14 projects upwardly from the upper edge of the cylinder section 1 and forms a pivot bearing 15 for the lever 16 that is weighted as at 17 to control movement of the valve 18 in the cylinder 19, the lever 16 having a link connection 20 with the valve 18 at the end thereof opposite the adjustable weight 17. The link 21 carried by the weighted end of the lever 16 above the cylinder section 1 is attached to the follower 22 slidable in the cylinder section 1 that engages the block 13.

A fluid F occupies the entire area within the expansible tube 6, cylinder section 2, and pipe 5 with the looped section 5a and said fluid may be introduced into the valve control device by removing the cap end 5b from the terminal loop end 5a, or by removing the plug 4 from the lower end of the cylinder section 2. When the fluid is introduced into the control device, it being understood that the cylinder sections 1 and 2 are in an inverted position, the fluid enters the expansible tube 6 by way of the longitudinal side groove 12 in the cylindrical core 8 which is to permit the escape of air from the expansible tube so that fluid only occupies the entire area within the control device. The fluid F is expanded by heat and in view of the restricted quantity within the expansible tube occasioned by the cylindrical core insert, such restricted quantity of fluid becomes highly sensitive to heat changes to effect an immediate and increased expansion and contraction of the expansible tube, the expansive movement of the tube being increased also by the body of fluid in the lower cylinder section 2 impinging or pressing upon the lower end of the cylindrical core 8. The valve 18 is illustrated in its closed position in the cylinder 19 within which the valve seats and upon contraction of the fluid, the weighted lever 16 causes the follower 22 to press upon the block 13 and aid in compression of the expansible tube 6 to effect unseating of the valve 18. The thermostatic valve loops 5a may be positioned in the desired location, such as in rooms or draft passages, for the thermostatic control of the valve 18 and the operation of said valve is rendered highly sensitive or quick acting in view of the relatively small quantity of volatile fluid within the expansible tube 6 resulting from the core insert 8. The lower end of the cylindrical core 8 depends into the upper end of the lower cylinder section 2 and is guided at its lower end in its sliding movement, the upper end of the core 8 being seated in the lower face of the block 13.

From the above detailed description, it is believed that the construction and operation will at once be apparent, and while there is herein shown and described the preferred embodiment of the present invention, it is nevertheless to be understood that minor changes may be made therein without departing from the spirit and scope of the invention as claimed.

I claim:—

1. In a hydrothermostatic valve control, a casing, an expansible tube in the casing closed at its upper end with the lower open end secured to the side wall of the casing, between the upper and lower ends of the casing forming a chamber between the upper end of the tube and the lower end of the casing, a thermostatic tube communicating with the lower end of the casing with a fluid filling the chamber and tube, and a core insert in the expansible tube occupying the major interior area thereof to render the fluid more responsive to temperature variations and said core depending below the lower end of the expansible tube to be impinged by the body of fluid in the lower end of the chamber.

2. In a hydrothermostatic valve control, an expansible tube containing a fluid and a core insert in the tube occupying the major interior area thereof to render the fluid more responsive to temperature variations, and said core having a longitudinal surface groove therein permitting the escape of air from the expansible tube when charging the same with the fluid.

3. In a hydrothermostatic valve control, a casing, an expansible tube in the casing closed at its upper end with the lower open end secured to the side wall of the casing, between the upper end of the tube and the lower end of the casing, a thermostatic tube communicating with the lower end of the casing with a fluid filling the chamber and tube, a core insert in the expansible tube occupying the major interior area thereof to render the fluid more responsive to temperature variations and said core depending below the lower end of the expansible tube to be impinged by the body of fluid in the lower end of the chamber, and said core having a longitudinal surface groove therein permitting the escape of air from the expansible tube when charging the same with the fluid.

4. In a hydrothermostatic valve control, an expansible tube containing a fluid and a core insert in the tube occupying the major interior area thereof to render the fluid more responsive to temperature variations, the upper end of the core having a threaded socket, a screw passed through the upper end of the expansible tube entering the core socket for securing the socket to the tube, and said core having a longitudinal surface groove therein permitting the escape of air from the expansible tube when charging the same with the fluid.

5. Thermostatic apparatus comprising a fluid holder having a rigid part and an expansible part and containing a fluid, the rigid part being in communication with the interior of the expansible part and a core insert carried by the expansible part of the holder.

6. Thermostatic apparatus comprising a fluid holder having a rigid part and an expansible part and containing a fluid, the rigid part being in communication with the interior of the expansible part, and a core insert carried by the expansible part of the holder and extending into the rigid part.

7. Thermostatic apparatus comprising a fluid holder having a rigid part and an expansible part and containing a fluid, the rigid part being in communication with the interior of the expansible part, and a core insert carried by the expansible part of the holder, and extending into the rigid part and occupying the major portion of the interior area of the expansible part to render the fluid more responsive to temperature variations.

In testimony whereof I affix my signature.

JAMES J. LAWLER.